United States Patent
Park et al.

(10) Patent No.: US 9,945,566 B2
(45) Date of Patent: Apr. 17, 2018

(54) HOT WATER-CENTERED COMBINED HOT WATER AND HEATING BOILER

(71) Applicant: KYUNGDONG NAVIEN CO., LTD., Pyeongtaek-si, Gyeonggi-do (KR)

(72) Inventors: Jun Kyu Park, Incheon (KR); Hyoung Rae Kim, Suwon-si (KR)

(73) Assignee: KYUNGDONG NAVIEN CO., LTD., Gyeonggi-Do (KR)

( * ) Notice: Subject to any disclaimer, the term of this patent is extended or adjusted under 35 U.S.C. 154(b) by 293 days.

(21) Appl. No.: 14/648,572

(22) PCT Filed: Oct. 15, 2013

(86) PCT No.: PCT/KR2013/009189
§ 371 (c)(1),
(2) Date: May 29, 2015

(87) PCT Pub. No.: WO2014/092323
PCT Pub. Date: Jun. 19, 2014

(65) Prior Publication Data
US 2015/0300661 A1    Oct. 22, 2015

(30) Foreign Application Priority Data
Dec. 12, 2012  (KR) .................. 10-2012-0144304

(51) Int. Cl.
*F24D 19/10*    (2006.01)
*F24D 3/08*     (2006.01)
(Continued)

(52) U.S. Cl.
CPC ........... *F24D 19/1069* (2013.01); *F24D 3/08* (2013.01); *F24D 17/0031* (2013.01); *F24H 1/14* (2013.01);
(Continued)

(58) Field of Classification Search
CPC .... F24D 19/1069; F24D 3/08; F24D 17/0031; F24D 17/0026; F24D 19/10; F24D 17/00;
(Continued)

(56) References Cited

U.S. PATENT DOCUMENTS 3,661,325 A * 5/1972 Altenstadt ............ F24H 1/0009
    237/8 R
3,815,813 A * 6/1974 Charron .................... F23N 5/02
    236/23
(Continued)

FOREIGN PATENT DOCUMENTS

DE    43 11 004 A1    10/1993
EP    0 674 140 A2    9/1995
(Continued)

OTHER PUBLICATIONS

International Search Report dated Jan. 7, 2014, issued to the corresponding International Application No. PCT/KR2013/009189.

*Primary Examiner* — Gregory Huson
*Assistant Examiner* — Daniel E Namay
(74) *Attorney, Agent, or Firm* — Stein IP, LLC (57) ABSTRACT

A hot water-centered hot water and heating combination boiler includes: a cold water inflow tube through which cold water flows in; a main heat exchanger which heats the cold water flowing in through the cold water inflow tube by using the combustion heat of a burner; a hot water discharge tube which discharges the hot water heated in the main heat exchanger; an auxiliary heat exchanger which supplies heating water during a heating mode, in which heating consumption place, and causes heat exchange to occur between the heated water in the main heat exchanger and the lowered temperature returning water, in which the heating consumption place; and a control part which controls the combustion of the burner during a hot water mode and heating mode.

7 Claims, 7 Drawing Sheets

(51) Int. Cl.
  *F24D 17/00* (2006.01)
  *F24H 1/14* (2006.01)
  *F24H 8/00* (2006.01)
  *F24H 1/52* (2006.01)
  *F24H 9/20* (2006.01)

(52) U.S. Cl.
  CPC .............. *F24H 1/52* (2013.01); *F24H 1/523* (2013.01); *F24H 8/00* (2013.01); *F24H 9/2035* (2013.01); *Y02B 30/102* (2013.01)

(58) Field of Classification Search
  CPC . Y02B 30/102; F24H 1/14; F24H 1/52; F24H 1/523; F24H 8/00; F24H 9/2035
  USPC .......................................................... 237/8 R
  See application file for complete search history.

(56) References Cited

U.S. PATENT DOCUMENTS

| | | | | |
|---|---|---|---|---|
| 4,756,475 A * | 7/1988 | Vergne | ...................... | F24H 1/52 237/56 |
| 7,040,544 B2 * | 5/2006 | Guyer | ...................... | F24D 5/02 237/12.1 |
| 8,291,869 B2 * | 10/2012 | Min | ...................... | F23N 5/242 122/155.1 |
| 8,498,523 B2 * | 7/2013 | Deivasigamani | ... | F24D 17/0026 392/307 |
| 8,910,880 B2 * | 12/2014 | Farrell | ...................... | F24D 3/08 122/15.1 |
| 9,182,159 B2 * | 11/2015 | Hatada | ...................... | F25B 27/00 |
| 2005/0098643 A1 * | 5/2005 | Guyer | ...................... | F24D 5/02 237/12.1 |
| 2008/0033651 A1 * | 2/2008 | Inoue | ...................... | F24H 1/52 702/3 |
| 2009/0090310 A1 * | 4/2009 | Farrell | ...................... | F24D 3/08 122/20 A |
| 2010/0195991 A1 * | 8/2010 | Deivasigamani | ... | F24D 17/0026 392/308 |
| 2011/0017152 A1 * | 1/2011 | Min | ...................... | F24D 3/08 122/19.1 |
| 2011/0203788 A1 * | 8/2011 | Kato | ...................... | F24D 12/02 165/292 |
| 2012/0090341 A1 * | 4/2012 | Hatada | ...................... | F25B 27/00 62/238.7 |
| 2015/0204550 A1 * | 7/2015 | Deivasigamani | ... | F24D 19/1069 237/2 A |
| 2015/0300661 A1 * | 10/2015 | Park | ...................... | F24H 1/523 237/8 R |

FOREIGN PATENT DOCUMENTS

| | | | |
|---|---|---|---|
| JP | 03175237 A | * | 7/1991 |
| JP | 06011144 A | * | 1/1994 |
| JP | 2000314558 A | * | 11/2000 |
| JP | 2001-193955 A | | 7/2001 |
| JP | 2005-61829 A | | 3/2005 |
| JP | 2005-114323 A | | 4/2005 |
| JP | 2008008589 A | * | 1/2008 |
| JP | 2010101524 A | * | 5/2010 |
| KR | 10-0570292 B1 | | 4/2006 |

* cited by examiner

[FIG. 1]

Prior Art

HOT WATER-CENTERED COMBINED HOT WATER AND HEATING BOILER

CROSS-REFERENCE TO RELATED APPLICATIONS

This application is a national stage of International Application No. PCT/KR2013/009189, filed Oct. 15, 2013, which claims the benefit of priority to Korean Application No. 10-2012-0144304, filed Dec. 12, 2012, in the Korean Intellectual Property Office, the disclosures of which are incorporated herein by reference.

TECHNICAL FIELD

The present invention relates to a hot water-centered hot water and heating combination boiler, and more particularly, to a hot water-centered hot water and heating combination boiler in which cold water is directly heated in a main heat exchanger by combustion heat of a burner to supply hot water in a hot water mode, and water returning from a heating consumption place is indirectly heated in an auxiliary heat exchanger by using the water heated in the main heat exchanger to supply heating water in a heating mode.

BACKGROUND ART

Boilers are being used for providing heating or hot water in general homes or public buildings. Commonly, boilers use oil or gas as fuels to burn the oil or gas through burners and then heat water by using combustion heat generated during the combustion process to circulate the heated water to indoor spaces, thereby heating the indoor spaces or providing hot water as necessary.

Figure 1:
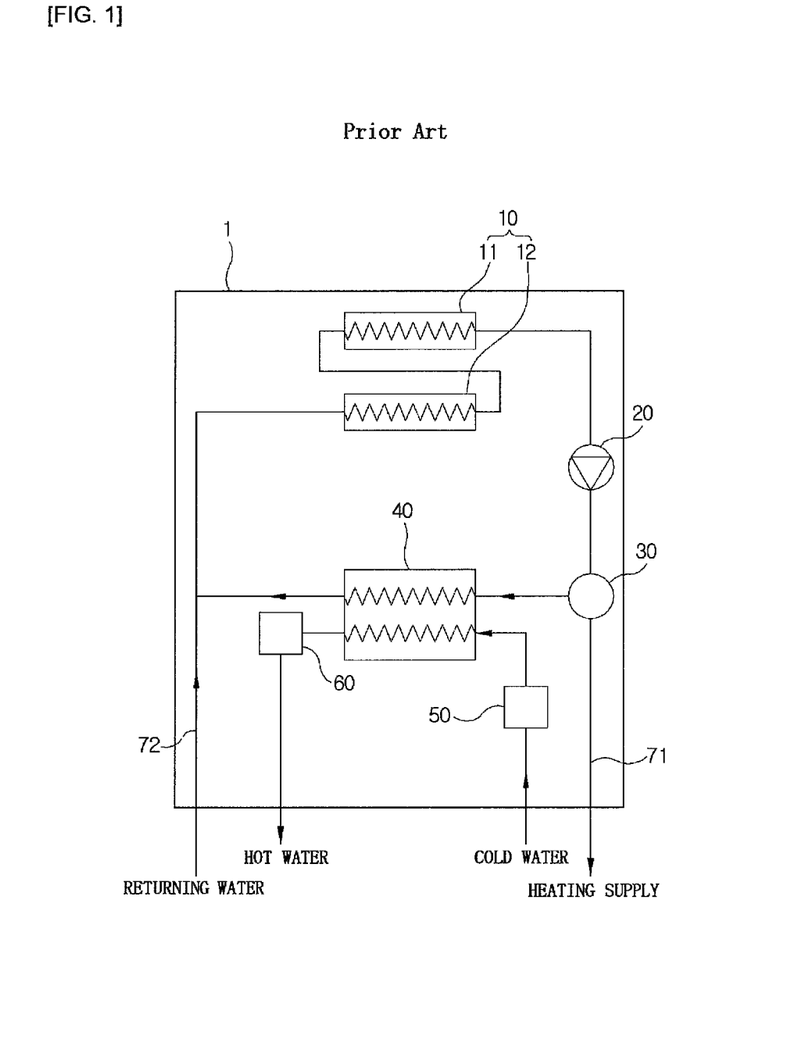
FIG. 1 is a view of a heating and hot water boiler according to the related art.

FIG. 1 is a view of a heating and hot water boiler according to a related art.

A heating and hot water combination boiler 1 according to the related art includes a main heat exchanger 10 for heating heating-water by combustion heat of a burner (not shown), a circulation pump 20 for circulating the heating water, a three-way valve 30 that is opened so that the heating water heated by the main heat exchanger 10 is supplied to a heating supply tube 71 in a heating mode and supplied to a hot-water supply heat exchanger 40 in a hot water mode, the hot-water heat exchanger 40 in which the heating water heated by the main heat exchanger 10 is heat exchanged with cold water so as to supply the hot water, a flow rate switch 50 for detecting introduction of the cold water, for example tap water, a temperature sensor 60 for detecting a temperature of the hot water that is supplied to a user, the heating supply tube 71 for supplying the heating water heated by the main heat exchanger 10 to a heating consumption place (not shown), and a returning water tube 72 through which returning water after consuming its heat in the heating consumption place flows.

In case of a condensing boiler, the main heat exchanger 10 is constituted by a sensible heat heat-exchanger 11 that absorbs combustion sensible heat of the burner and a latent heat heat-exchanger 12 that absorbs latent heat of vapor contained in a combustion gas that is heat-exchanged in the sensible heat heat-exchanger 11.

Vertical arrangement of the sensible heat heat-exchanger 11 and the latent heat heat-exchanger 12 of FIG. 1 corresponds to a downward combustion type burner. When an upward combustion type burner is installed, the burner, the sensible heat heat-exchanger, and the latent heat heat-exchanger may be successively disposed from the bottom.

In such a heating and hot water combination boiler according to the related art, in the heating mode, the returning water is directly heated in the main heat exchanger 10 by the combustion heat of the burner, and in the hot water mode, the cold water is indirectly heated in the hot-water supply heat exchanger 40 by using the heating water heated in the main heat exchanger 10, and thus the hot water is supplied to the user.

Generally, if the user intends to use the hot water, the user expects hot water having a desired temperature to come out when he turns on the tap. Also, if the boiler operates to heat the indoor space, it is expected that it takes a predetermined time until an indoor temperature increases.

In the above-described heating and hot water combination boiler according to the related art, since the cold water is indirectly heated in the hot-water supply heat exchanger 40 by using the heating water heated in the main heat exchanger 10 to supply the hot water to the user in the hot water mode, it takes a lot of time to increase the temperature of the hot water up to a temperature desired by the user, and thus it may not satisfy the user's desire to immediately use the hot water having the desired temperature. Also, since more amount of heat is needed in the hot water mode when compared to the heating mode, energy consumption may increase in countries where the hot water is used a lot.

Also, if the user turns on the hot water tap to changes in usage amount of hot water while using the hot water, heat of combustion of the burner is adjusted. However, since the cold water is indirectly heated in the hot-water supply heat exchanger 40, it takes a lot of time until the temperature of the hot water reaches a preset temperature desired by the user even though the heat of the combustion of the burner changes. Also, the hot water may change to a temperature higher or lower than the preset temperature to cause temperature deviation.

DISCLOSURE OF THE INVENTION

Technical Problem

An object of the present invention is to provide a hot water-centered hot water and heating combination boiler in which heat-exchanging for supplying hot water is performed in a main heat exchanger, and heat-exchanging for supplying heating water is performed in an auxiliary heat exchanger to quickly supply the hot water, save energy, and easily control a temperature of the hot water

Technical Solution

A hot water-centered hot water and heating combination boiler to achieve the above-described object includes: a cold water inflow tube to which cold water is introduced; a main heat exchanger for heating the cold water introduced through the cold water inflow tube by using combustion heat of a burner; a hot water discharge tube for discharging hot water heated in the main heat exchanger; an auxiliary heat exchanger for heat-exchanging water heated in the main heat exchanger with returning water that is reduced in temperature in a heating consumption place to supply heating water to the heating consumption place in a heating mode; and a control part for controlling combustion of the burner in a heating mode and the heating mode.

The main heat exchanger may be constituted by a sensible heat heat-exchanger that absorbs combustion sensible heat of the burner and a latent heat heat-exchanger that absorbs latent heat of vapor contained in combustion gas that is heat-exchanged in the sensible heat heat-exchanger, and the water introduced through the cold water inflow tube may successively pass through the latent heat heat-exchanger and the sensible heat heat-exchanger and then discharged to the hot water discharge tube.

The latent heat heat-exchanger may be constituted by a hot water latent heat heat-exchanger having one side that is connected to the cold water inflow tube and the other end that is connected to the sensible heat heat-exchanger and a heating latent heat heat-exchanger having one side that is connected to a returning water tube to which the returning water is introduced and the other side that is connected to a heating-side heat exchange part inlet of the auxiliary heat exchanger, and the combustion gas generated from the burner may be heat-exchanged while successively passing through the sensible heat heat-exchanger, the hot water latent heat heat-exchanger, and the heating latent heat heat-exchanger.

The hot water-centered hot water and heating combination boiler may further include: a hot water introduction connection tube for connecting the hot water discharge tube to a hot water-side heat exchange part inlet of the auxiliary heat exchanger; and a hot water discharge connection tube for connecting the cold water inflow tube to a hot water-side heat exchange part outlet of the auxiliary heat exchanger.

A hot water circulating pump for circulating the water discharged through the hot water-side heat exchange part outlet of the auxiliary heat exchanger into the hot water-side heat exchange part inlet via the cold water inflow tube, the main heat exchanger, and the hot water discharge tube may be disposed on the hot water discharge connection tube or the hot water introduction connection tube, wherein the hot water circulating pump may stop in the hot water mode and operate in the heating mode.

A check valve for preventing the cold water introduced through the cold water inflow tube from being introduced into the hot water discharge connection tube may be disposed on the hot water discharge connection tube.

A flow switch for detecting a flow of the heating water to transmit a signal to the control part to allow the burner to perform combustion may be disposed on a tube through which the heating water flows.

Advantageous Effects

According to the hot water-centered hot water and heating combination boiler, since the combustion gas of the burner is directly heat-exchanged with the cold water in the main heat exchanger to supply the hot water, the hot water desired by the user may be quickly supplied, and the hot water may be easily controlled in temperature without the temperature deviation even though the usage amount of hot water changes. Also, when the hot water is used a lot, energy may be saved.

MODE FOR CARRYING OUT THE INVENTION

Hereinafter, components and effects of the preferred embodiment of the present invention will be described in detail with reference to the accompanying drawings.

First Embodiment

Figure 2:
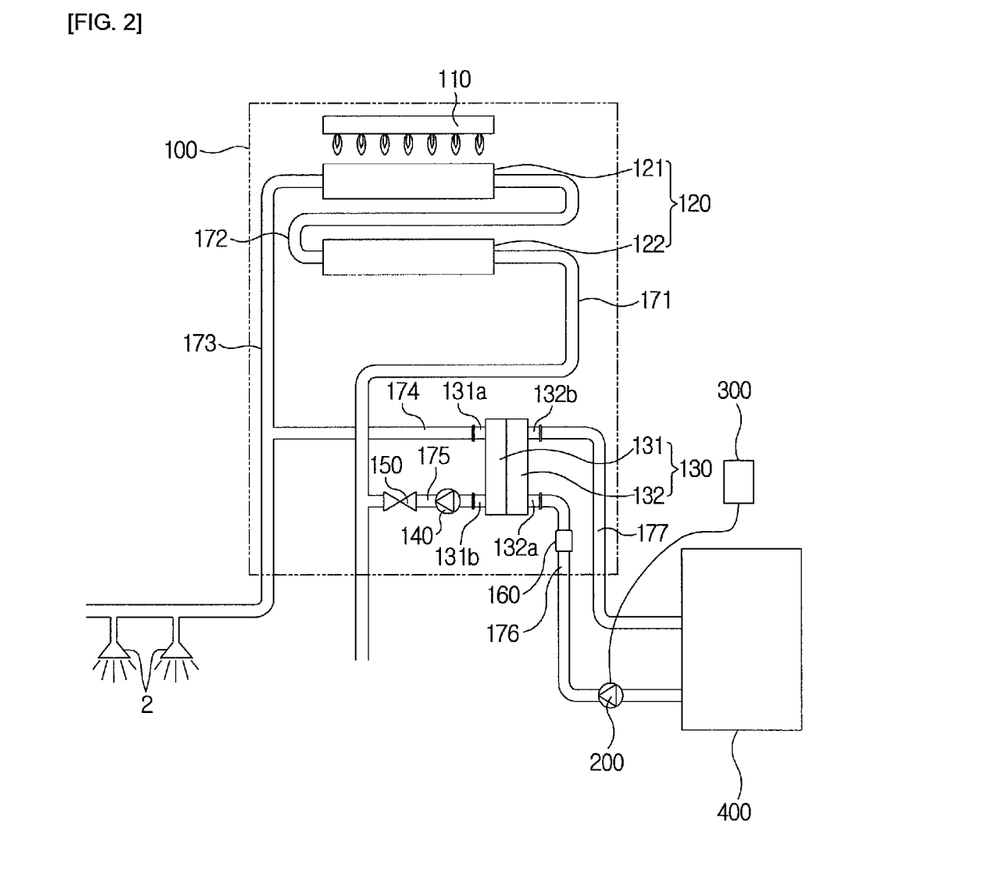
FIG. 2 is a view of a boiler according to a first embodiment of the present invention.

FIG. 2 is a view of a boiler according to a first embodiment of the present invention.

A hot water and heating combination boiler 100 according to the first embodiment includes a burner 110 for burning a mixed gas in which air is mixed with gas to generate flames, a main heat exchanger 120 directly heating cold water by combustion heat of the burner 110, and an auxiliary heat exchanger 130 for heat-exchanging the water heated in the main heat exchanger 120 with water returning from a heating consumption place in order to supply heating water having a high temperature.

The main heat exchanger 120 is constituted by a sensible heat heat-exchanger 121 that absorbs combustion sensible heat of the burner 110 and a latent heat heat-exchanger 122 that absorbs latent heat of vapor contained in combustion gas that is heat-exchanged in the sensible heat heat-exchanger 121.

In the current embodiment, although the burner 110 is a downward combustion type burner, the burner may be an upward combustion type burner. If the burner is the upward combustion type burner, the sensible heat heat-exchanger and the latent heat heat-exchanger are reversely changed in vertical arrangement, and the burner is disposed under the sensible heat heat-exchanger.

A cold water inflow tube 171 to which the cold water, for example tap water, is introduced is connected to one side of the latent heat heat-exchanger 122, and a heat exchanger connection tube 172 for connecting the latent heat heat-exchanger 122 to the sensible heat heat-exchanger 121 is connected to the other side of the latent heat heat-exchanger 122. The heat exchanger connection tube 172 is connected to one side of the sensible heat heat-exchanger 121, and a hot water discharge tube 173 for discharging the hot water heated in the main heat exchanger 120 to a user is connected to the other side of the sensible heat heat-exchanger 121.

Thus, the cold water having a low temperature introduced through the cold water inflow tube 171 may absorb condensed latent heat of the vapor contained in the combustion gas while passing through the latent heat heat-exchanger 122 and then be introduced into the sensible heat heat-exchanger 121 via the heat exchanger connection tube 172. Then, hot water having a high temperature by absorbing combustion sensible heat generated from the burner 110 while passing through the sensible heat heat-exchanger 121 may pass through the hot water discharge tube 173 and be supplied to the user through a water discharge hole 2.

The auxiliary heat exchanger 130 is constituted by a hot water-side heat exchange part 131 through which water heated in the main heat exchanger 120 flows and a heating-side heat exchange part 132 through which returning water that is reduced in temperature by being heat-exchanged in a heating consumption place 400 flows.

A hot water-side heat exchange part inlet 131a into which the hot water having a high temperature is introduced and a hot water-side heat exchange part outlet 131b from which water having a low temperature that is heat-exchanged with the returning water having a low temperature flowing through the heating-side heat exchange part 132 is discharged are disposed on the hot water-side heat exchange part 131.

A heating-side heat exchange part inlet 132a into which the returning water having a low temperature is introduced and a heating-side heat exchange part outlet 132b from which heating water having a high temperature that is heat-exchanged with the hot water having a high temperature flowing through the hot water-side heat exchange part 131 is discharged are disposed on the heating-side heat exchange part 132.

A hot water introduction connection tube 174 connects the hot water discharge tube 173 to the hot water-side heat exchange part inlet 131a. A hot water discharge connection tube 175 connects the hot water-side heat exchange part outlet 131b to the cold water inflow tube 171.

A hot water circulating pump 140 for supplying the water discharged through the hot water-side heat exchange part outlet 131b of the auxiliary heat exchanger 130 to the cold water inflow tube 171 is disposed on the hot water discharge connection tube 175. The hot water circulating pump 140 stops in a hot water mode and operates in a heating mode to allow the water to circulate in the cold water inflow tube 171, the main heat exchanger 120 and the hot water discharge tube 173. If the hot water circulating pump 140 is disposed on the cold water inflow tube 171 or the hot water discharge tube 173, pressure loss of the cold water or hot water may occur in the hot water mode. Thus, the hot water circulating pump 140 may be disposed on the hot water discharge connection tube 175 to prevent the pressure loss from occurring in the hot water mode.

In the current embodiment, although the hot water circulating pump 140 is disposed on the hot water discharge connection tube 175, the hot water circulating pump 140 may be disposed on the hot water introduction connection tube 174.

A check valve 150 is disposed in the hot water discharge connection tube 175. The check valve 150 may prevent the cold water introduced through the cold water inflow tube 171 from being introduced into the hot water discharge connection tube 175 in the hot water mode. Also, the check valve 150 may allow the water that is forcibly transferred by the hot water circulating pump 140 to be supplied into the cold water inflow tube 171 in the heating mode. Since the cold water introduced through the cold water inflow tube 171 has a pressure that is higher than that of the hot water discharged through the hot water discharge tube 173 in the hot water mode, the hot water within the hot water discharge tube 173, the hot water introduction connection tube 174, the hot water-side heat exchange part 131, and the hot water discharge connection tube 175 may not be introduced into the cold water inflow tube 171 through the check valve 150 in the hot water mode.

A returning water tube 176 to which the returning water is introduced from the heating consumption place 400 is connected to the heating-side heat exchange part inlet 132a. A heating supply tube 177 for supplying the heating water heated while passing through the heating-side heat exchange part 132 to the heating consumption place 400 is connected to the heating-side heat exchange part outlet 132b.

A flow switch 160 for detecting a flow of the heating water is disposed on the returning water tube 176. A heating water circulating pump 200 disposed outside the boiler 100 is connected to a temperature adjusting unit 300 and controlled in operation according to a user's heating request. The temperature adjusting unit 300 is manipulated by the user. A separate control part (not shown) is disposed in the boiler 100 to control operation of the boiler 100. Since the temperature adjusting unit 300 transmits a signal only to the heating water circulating pump 200 disposed outside the boiler 100, the boiler 100 may not detect that the heating operation is performed even though the user manipulates the temperature adjusting unit 300. Thus, when the heating water flows by the heating water circulating pump 200, the flow switch 160 disposed in the boiler 100 may detect the flow of the heating water to transmit the signal to the control part, thereby performing the heating.

Although not shown, a flow rate sensor (not shown) may be disposed on the cold water inflow tube 171 to detect whether the user uses the hot water, and a temperature sensor (not shown) may be disposed on the hot water discharge tube 173 so that the temperature of the discharged hot water is measured and adjusted.

Figure 3:
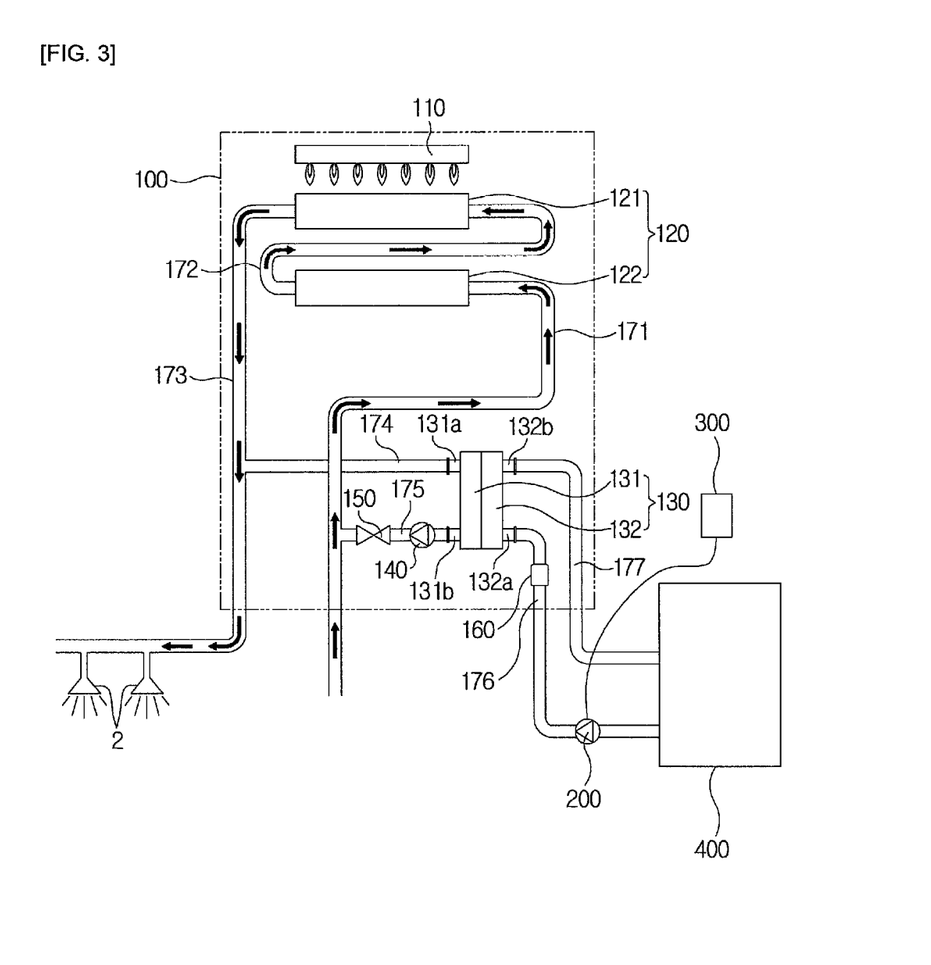
FIG. 3 is a view illustrating a state in which the boiler of FIG. 2 operates when hot water is used.

FIG. 3 is a view illustrating a state in which the boiler of FIG. 2 operates when hot water is used.

When the user turns on the tap to use the hot water, the flow rate sensor disposed on the cold water inflow tube 171 detects the flow of the cold water, and the burner 110 receives the detected signal to operate to supply the hot water.

The cold water introduced through the cold water inflow tube 171 is forcibly transferred into the cold water inflow tube 171 by its own pressure and then is introduced into the latent heat heat-exchanger 122 and thus is heat-exchanged. Then, the heat-exchanged cold water is secondly heat-exchanged again in the sensible heat heat-exchanger 121 and discharged to the discharge hole 2 through the hot water discharge tube 173.

In this case, although the hot water discharged through the hot water discharge tube 173 is filled within the hot water introduction connection tube 174, the hot water-side heat exchange part 131, and the hot water discharge connection tube 175, the cold water introduced through the cold water inflow tube 171 has a pressure higher than that of the hot water. Thus, the hot water may not be introduced from the hot water discharge connection tube 175 into the cold water inflow tube 171 through the check valve 150.

Also, since the hot water circulating pump 140 for circulating the hot water is not disposed on the cold water inflow tube 171 or the hot water discharge tube 173 but is disposed on the hot water discharge connection tube 175 in the heating mode, there is no flow path resistance in a case in which the cold water introduced through the cold water inflow tube 171 flows and in a case in which the hot water discharged through the hot water discharge tube 173 flows.

Like this, since the cold water having a low temperature is directly heat-exchanged with the combustion gas of the burner 110 in the hot water mode, the hot water having a temperature desired by the user may be quickly supplied.

As described above, when the user changes a usage amount of hot water while using the hot water, a flow rate signal is inputted from the flow rate sensor to the control part, and the control part changes a combustion amount of burner 110 so that the boiler corresponds to the changed flow rate. In this case, the cold water is directly heat-exchanged with the combustion gas, and thus the boiler may quickly correspond to the changed flow rate. And thus, the cold water may reach a preset temperature without a temperature deviation.

Figure 4:
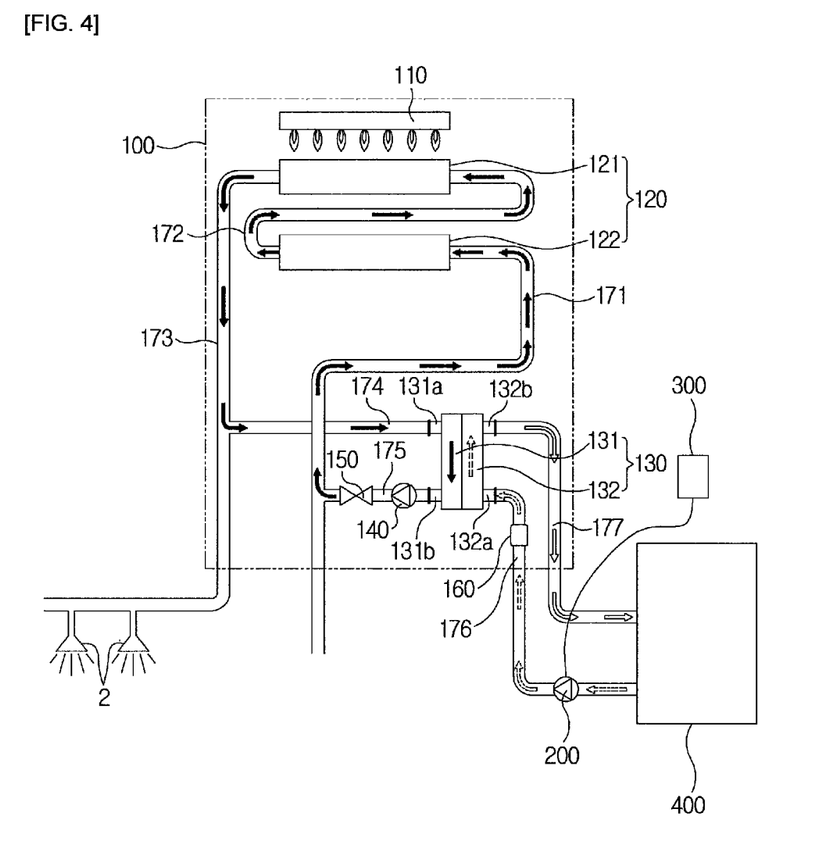
FIG. 4 is a view illustrating a state in which the boiler of FIG. 2 operates when heating is performed.

FIG. 4 is a view illustrating a state in which the boiler of FIG. 2 operates when heating is performed.

When the user manipulates the temperature adjusting unit 300 to perform the heating mode, the heating water circulating pump 200 operates to allow the heating water having a low temperature to be introduced into the heating-side heat exchange part 132 of the auxiliary heat exchanger 130 through the returning water tube 176. In this case, the flow switch 160 may detect the flow of the heating water to transmit the detected signal to the control part, and the control part operates the burner 110. The heating water may be heat-exchanged with the hot water of the hot water-side heat exchange part 131 while passing through the heating-side heat exchange part 132 and thus be increased in temperature and then supplied to the heating consumption place 400 through the heating supply tube 177. The returning water that is reduced in temperature by being heat-exchanged in the heating consumption place 400 may be repeatedly circulated through the returning water tube 176.

At the hot water-side, the hot water circulating pump 140 operates together with the operation of the burner 110 to allow the water having a low temperature to absorb latent heat of the vapor while passing through the latent heat heat-exchanger 122 via the hot water discharge connection tube 175 and the cold water inflow tube 171 and absorb combustion sensible heat of the burner 110 while passing through the sensible heat heat-exchanger and become hot water having a high temperature. The hot water heated by the above-described process may successively pass through the hot water discharge tube 173 and the hot water introduction connection tube 174 and be introduced into the hot water-side heat exchange part 131 and heat-exchanged with the heating water having a low temperature passing through the heating-side heat exchange part 132. The water discharged from the hot water-side heat exchange part 131 may be repeatedly circulated in the cold water inflow tube 171 through the hot water discharge connection tube 175 in a state in which the water is reduced in temperature.

Like this, according to the present invention, since the water is directly heated by the burner 110 in the main heat exchanger 120 in the hot water mode, and the heating water is indirectly heated in the auxiliary heat exchanger 130 in the heating mode, the hot water may be quickly supplied and easily controlled in temperature even though the hot water is used a lot.

Second Embodiment

Figure 5:
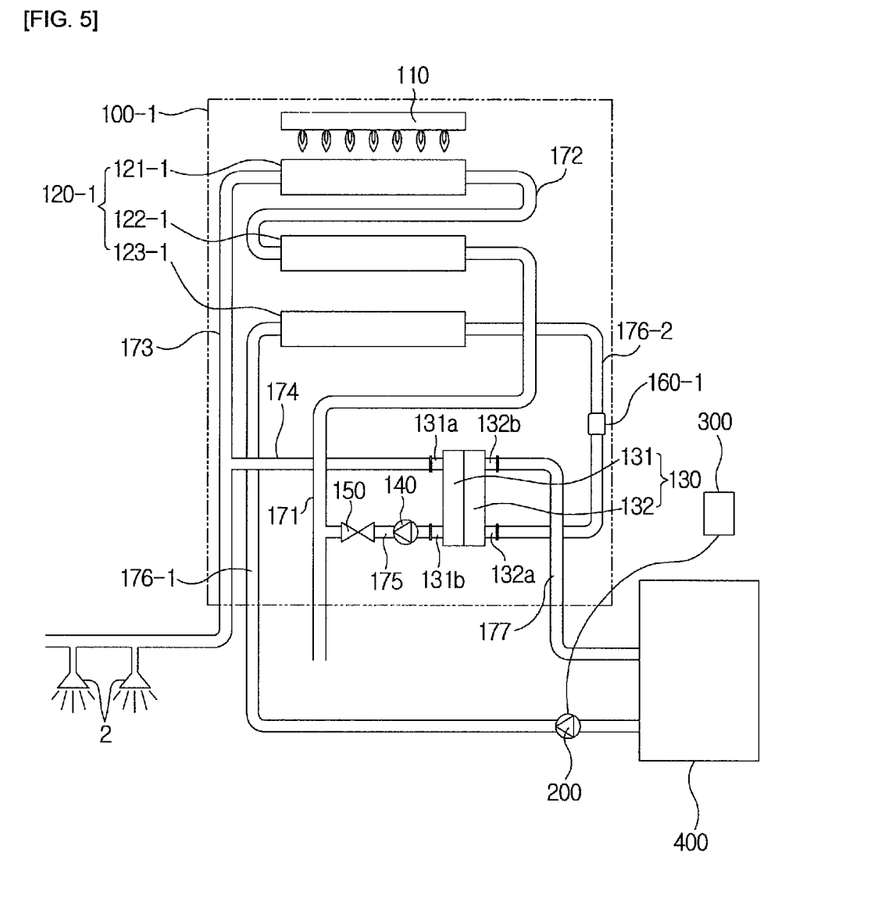
FIG. 5 is a view of a boiler according to a second embodiment of the present invention.

FIG. 5 is a view of a boiler according to a second embodiment of the present invention. Since most of the components of the boiler according to the second embodiment are the same as that of the first embodiment, hereinafter, different components will be mainly described.

A hot water and heating combination boiler 100-1 according to the second embodiment includes a burner 110, a main heat exchanger 120-1 directly heating cold water by combustion heat of the burner 110, and an auxiliary heat exchanger 130 for heat-exchanging water heated in the main heat exchanger 120-1 with returning water to supply the returning water having a high temperature.

The main heat exchanger 120-1 is constituted by a sensible heat heat-exchanger 121-1 and latent heat heat-exchangers 122-1 and 123-1. In the current embodiment, the latent heat heat-exchangers 122-1 and 123-1 are constituted by a hot water latent heat heat-exchanger 122-1 having one side that is connected to a cold water inflow tube 171 and the other side that is connected to the sensible heat heat-exchanger 121-1 and a heating latent heat heat-exchanger 123-1 having one side that is connected to a returning water tube 176-1 into which the returning water is introduced and the other side that is connected to a heating-side heat exchange part inlet 132a of the auxiliary heat exchanger 130.

A combustion gas generated from the burner 110 is heat-exchanged while successively passing through the sensible heat heat-exchanger 121-1, the hot water latent heat heat-exchanger 122-1, and the heating latent heat heat-exchanger 123-1. Here, the combustion gas is heat-exchanged with the cold water in the sensible heat heat-exchanger 121-1 and the hot water latent heat heat-exchanger 122-1 and with the heating water in the heating latent heat heat-exchanger 123-1.

A first returning water tube 176-1 through which the returning water flows is connected to the one side of the heating latent heat heat-exchanger 123-1. A second returning water tube 176-2 through which the returning water that is increased in temperature by being heat-exchanged in the heating latent heat heat-exchanger 123-1 flows is connected to the other side of the heating latent heat heat-exchanger 123-1. The second returning water tube 176-2 is connected to the inlet 132a of a heating-side heat exchange part 132.

A flow switch 160-1 for detecting a flow of the heating water is disposed on the second returning water tube 176-2. A heating supply tube 177 is connected to an outlet 132b of the heating-side heat exchange part 132.

A hot water introduction connection tube 174 connected to an inlet 131a of a hot water-side heat exchange part 131, a hot water discharge connection tube 175 connected to an outlet 131b of the hot water-side heat exchange part 131, and a hot water circulating pump 140 and a check valve disposed on the hot water discharge connection tube 175 are equally provided as those of the first embodiment.

Figure 6:
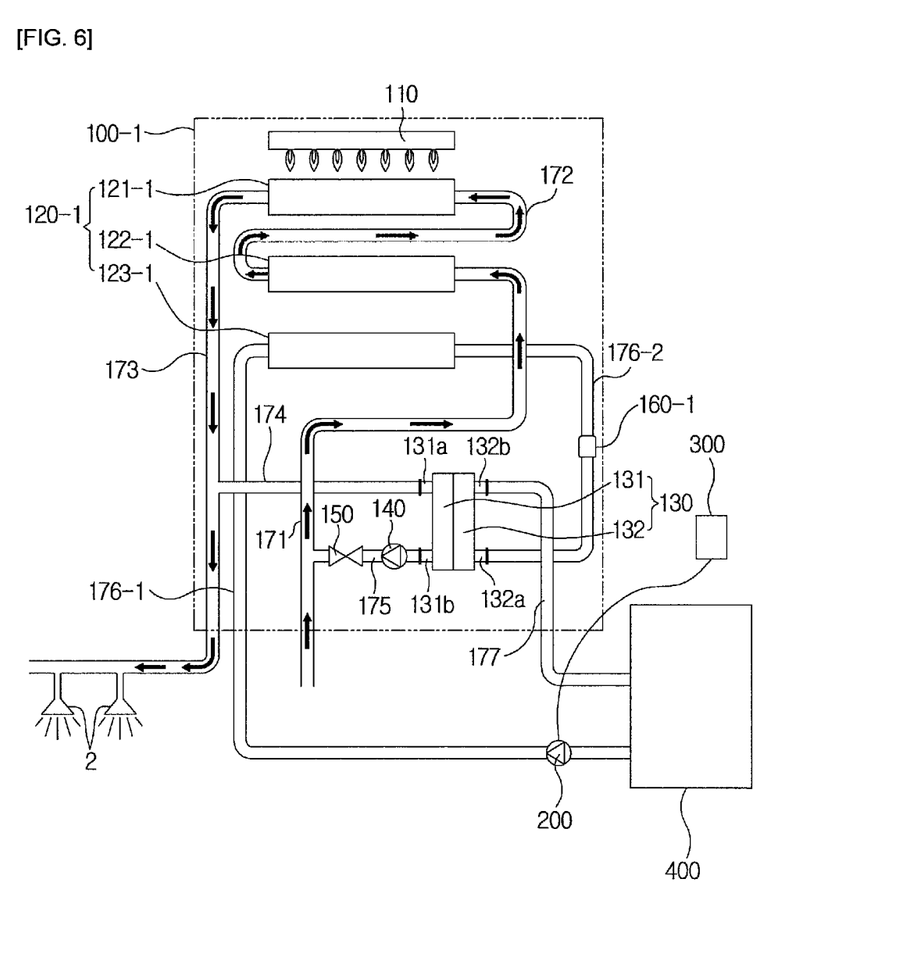
FIG. 6 is a view illustrating a state in which the boiler of FIG. 5 operates when hot water is used.

FIG. 6 is a view illustrating a state in which the boiler of FIG. 5 operates when hot water is used.

When the user turns on the tap to use the hot water, a flow rate sensor (not shown) may detect a flow of the cold water to allow the burner 110 to operate, and the cold water is introduced into a cold water inflow tube 171 and heat-exchanged while passing through the hot water latent heat heat-exchanger 122-1 and also heat-exchanged while passing through the sensible heat heat-exchanger 121-1 and thus be increased in temperature. Thus, the hot water having a high temperature is supplied to the user through a discharge hole 2 via a hot water discharge tube 173.

Figure 7:
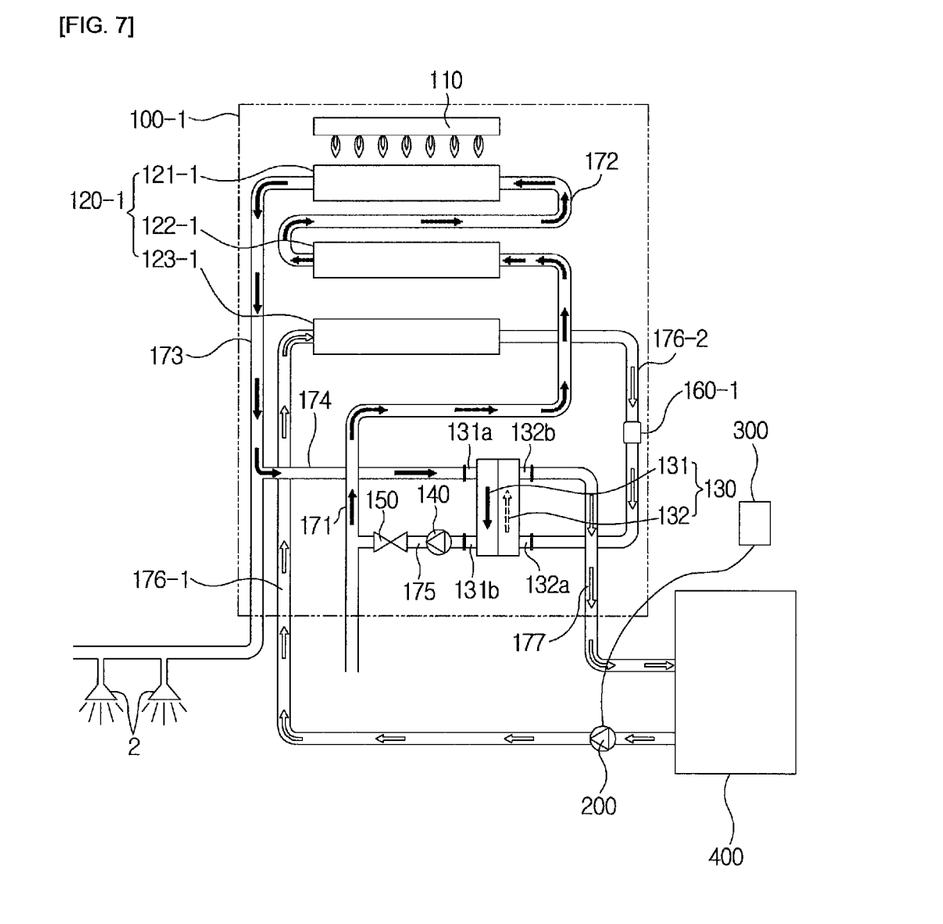
FIG. 7 is a view illustrating a state in which the boiler of FIG. 5 operates when heating is performed.

FIG. 7 is a view illustrating a state in which the boiler of FIG. 5 operates when heating is performed.

When the user manipulates a temperature adjusting unit 300 to perform a heating mode, a heating water circulating pump 200 operates to allow the heating water to absorb condensed latent heat of vapor while passing through the heating latent heat heat-exchanger 123-1 through the returning water tube 176-1 and be firstly heat-exchanged.

The returning water passing through the heating latent heat heat-exchanger 123-1 is introduced into the inlet 132a of the heating-side heat exchange part 132 and heat-exchanged with the hot water passing through the hot water-side heat exchange part 132 while passing through the heating-side heat exchange part 132 and thus be increased in temperature. Then, the heating water having a high temperature is supplied to a heating consumption place 400 via the heating supply tube 177.

Like this, according to the second embodiment, since the cold water is directly heat-exchanged with the combustion gas of the burner 110 in the main heat exchanger 120-1 in the hot water mode, the hot water may be quickly supplied and easily controlled in temperature even though the hot water is used a lot. Also, since the combustion gas generated from the burner 110 is heat-exchanged three times while passing through the sensible heat heat-exchanger 121-1, the hot water latent heat heat-exchanger 122-1, and the heating latent heat heat-exchanger 123-1, and the heating water is pre-heated in the heating latent heat heat-exchanger 123-1 before being heat-exchanged in the auxiliary heat exchanger 130 and then introduced into the heating-side heat exchange part 132 of the auxiliary heat exchanger 130, the boiler may be improved in heat efficiency in the heating mode.

In the current embodiment, although the main heat exchanger is a condensing type heat exchanger, the present invention may be applied to a general boiler in which only a sensible heat heat-exchanger is disposed without a latent heat heat-exchanger.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. Therefore, the preferred embodiments should be considered in descriptive sense only and not for purposes of limitation.

The invention claimed is:

1. A hot water-centered hot water and heating combination boiler comprising:
    a cold water inflow tube to which cold water is introduced;
    a main heat exchanger includes at least one heat exchanger for heating the cold water introduced through the cold water inflow tube by using combustion heat of a burner and a heating latent heat heat-exchanger for heating water circulating through a fluid circuit comprising a heating consumption place by using combustion heat of the burner when a heating mode is operated, the fluid circuit fluidly isolated from a circuit comprising the at least one heat exchanger;
    a hot water discharge tube for discharging hot water heated in the at least one heat exchanger;
    an auxiliary heat exchanger for heat-exchanging heat from water heated in the at least one heat exchanger with returning water that is reduced in temperature in the heating consumption place to supply heating water to the heating consumption place in the heating mode; and
    a control part for controlling combustion of the burner in a heating hot water mode and the heating mode.

2. The hot water-centered hot water and heating combination boiler of claim 1,
    wherein the at least one heat exchanger comprises a sensible heat heat-exchanger that absorbs combustion sensible heat of the burner and a hot water latent heat heat-exchanger having one side that is connected to the cold water inflow tube and the other end that is connected to the sensible heat heat-exchanger, the heating latent heat heat-exchanger having one side that is connected to a returning water tube to which the returning water is introduced and the other side that is connected to a heating-side heat exchange part inlet of the auxiliary heat exchanger, and the combustion gas generated from the burner is heat-exchanged while successively passing through the sensible heat heat-exchanger, the hot water latent heat heat-exchanger, and the heating latent heat heat-exchanger.

3. The hot water-centered hot water and heating combination boiler of claim 1, further comprising:
    a hot water introduction connection tube for connecting the hot water discharge tube to a hot water-side heat exchange part inlet of the auxiliary heat exchanger; and
    a hot water discharge connection tube for connecting the cold water inflow tube to a hot water-side heat exchange part outlet of the auxiliary heat exchanger.

4. The hot water-centered hot water and heating combination boiler of claim 3,
    wherein a hot water circulating pump for circulating the water discharged through the hot water-side heat exchange part outlet of the auxiliary heat exchanger into the hot water-side heat exchange part inlet via the cold water inflow tube, the main heat exchanger, and the hot water discharge tube is disposed on the hot water discharge connection tube, wherein the hot water circulating pump stops in the hot water mode and operates in the heating mode.

5. The hot water-centered hot water and heating combination boiler of claim 3,
    wherein a hot water circulating pump for circulating the water discharged through the hot water-side heat exchange part outlet of the auxiliary heat exchanger into the hot water-side heat exchange part inlet via the cold water inflow tube, the main heat exchanger, and the hot water discharge tube is disposed on the hot water introduction connection tube, wherein the hot water circulating pump stops in the hot water mode and operates in the heating mode.

6. The hot water-centered hot water and heating combination boiler of claim 3,
    wherein a check valve for preventing the cold water introduced through the cold water inflow tube from being introduced into the hot water discharge connection tube is disposed on the hot water discharge connection tube.

7. The hot water-centered hot water and heating combination boiler of claim 1,
    wherein a flow switch for detecting a flow of the heating water to transmit a signal to the control part to allow the burner to perform combustion is disposed on a tube through which the heating water flows.

* * * * *